US008616235B2

(12) United States Patent
Maskell

(10) Patent No.: US 8,616,235 B2
(45) Date of Patent: Dec. 31, 2013

(54) VALVES

(75) Inventor: Bruce W. Maskell, Moorpark, CA (US)

(73) Assignee: Zodiac Pool Systems, Inc., Vista, CA (US)

( * ) Notice: Subject to any disclaimer, the term of this patent is extended or adjusted under 35 U.S.C. 154(b) by 165 days.

(21) Appl. No.: 13/006,672

(22) Filed: Jan. 14, 2011

(65) Prior Publication Data

US 2011/0175010 A1 Jul. 21, 2011

Related U.S. Application Data

(60) Provisional application No. 61/295,221, filed on Jan. 15, 2010.

(51) Int. Cl.
*F16K 15/03* (2006.01)
(52) U.S. Cl.
USPC .......................................... 137/527; 251/337
(58) Field of Classification Search
USPC ............. 137/527, 527.2, 527.8, 537; 251/337
See application file for complete search history.

(56) References Cited

U.S. PATENT DOCUMENTS

| 940,182 | A | * | 11/1909 | Morgan et al. ................. 137/527 |
|---|---|---|---|---|
| 2,001,941 | A | * | 5/1935 | Rowe et al. .................... 137/527 |
| 2,556,277 | A | * | 6/1951 | Hill et al. ....................... 137/527 |
| 3,106,220 | A | * | 10/1963 | Hose .......................... 137/527.8 |
| 5,711,341 | A | * | 1/1998 | Funderburk et al. ........ 137/527.2 |
| 6,152,173 | A | * | 11/2000 | Makowan ...................... 137/527 |
| 6,247,489 | B1 | | 6/2001 | Maskell et al. |
| 6,314,993 | B1 | * | 11/2001 | Matthews et al. ............. 137/527 |
| 7,533,691 | B2 | * | 5/2009 | Marcoux et al. .............. 137/527 |
| 2008/0236680 | A1 | * | 10/2008 | Abram et al. ................. 137/527 |

* cited by examiner

Primary Examiner — John Rivell
(74) Attorney, Agent, or Firm — Dean W. Russell; Kilpatrick Townsend & Stockton LLP

(57) ABSTRACT

Valves, and particularly check valves, are detailed. The valves may isolate a spring or other biasing member from flowing fluid so as to reduce the possibility of damage to the spring caused, for example, by chemicals contained in the fluid. In some versions of the valves, the spring may be positioned within a cavity of a cover sealed from the fluid.

6 Claims, 1 Drawing Sheet

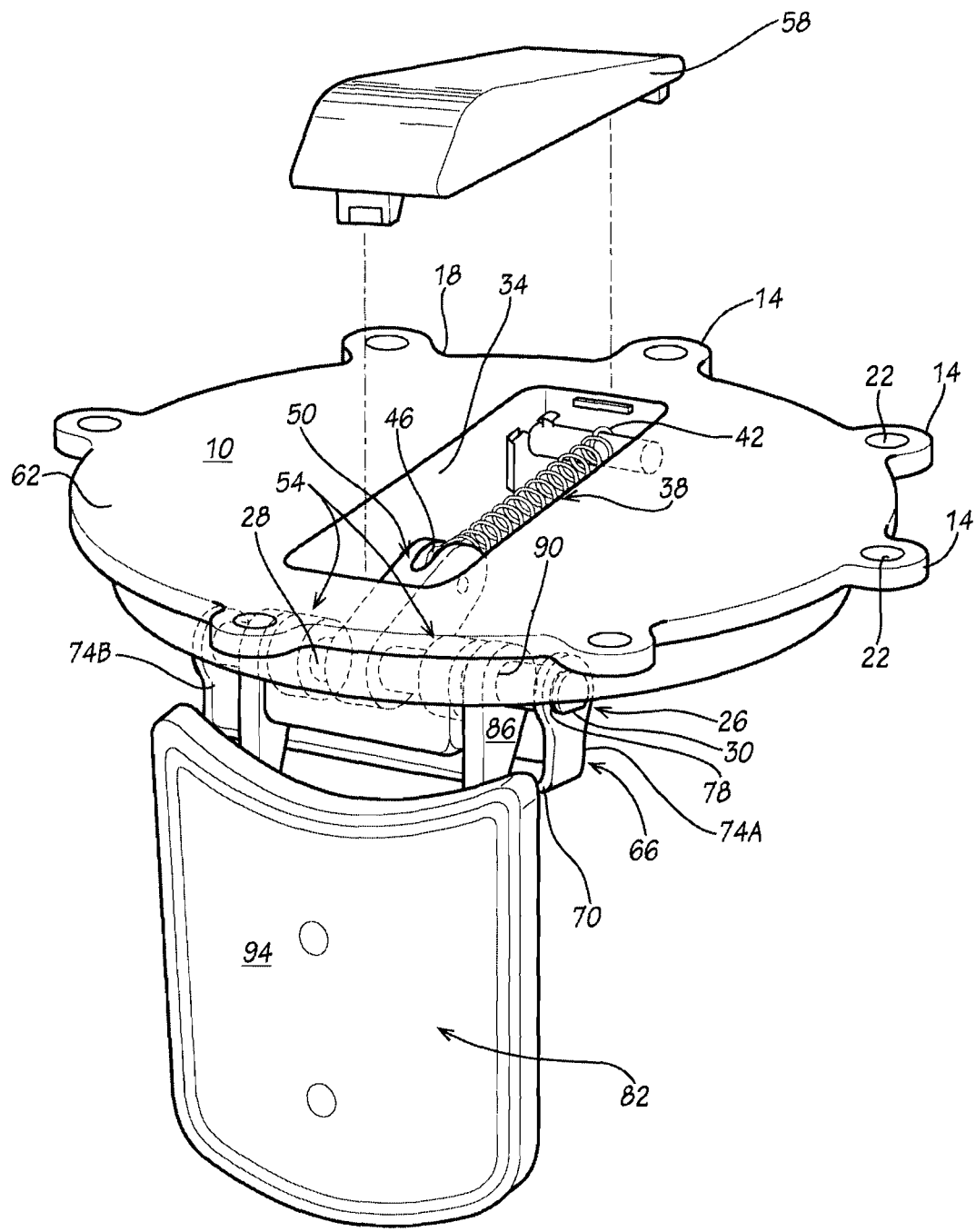

VALVES

CROSS-REFERENCE TO RELATED APPLICATION

This application claims the benefit of U.S. Provisional Application No. 61/295,221 entitled "Valves" filed on Jan. 15, 2010, the contents of which are incorporated herein by reference.

FIELD OF THE INVENTION

This invention relates to valves and more particularly, although not necessarily exclusively, to check valves designed to accommodate fluids having, e.g., low pH or high salt content.

BACKGROUND OF THE INVENTION

U.S. Pat. No. 6,247,489 to Maskell, et al., discloses an exemplary check valve especially useful as part of the water-recirculation system of a swimming pool, spa, or hot tub. The check valve includes a housing and a cover removably attached thereto. The housing may include coupling portions defining ports through which fluid may enter and exit the housing.

Pivotally attached to the cover of the check valve of the Maskell patent is a flapper assembly. The flapper assembly may comprise a diverter member having a body and two attachment arms. Pins are inserted through bores in the arms and the cover to attach the diverter member of the flapper assembly to the cover.

A spring (or other biasing member) may be positioned between the cover and the flapper assembly of the valve of the Maskell patent. The spring functions to bias the flapper assembly "into sealing engagement" with seats associated with the housing. Hence, when fluid flows through a conduit and into the entry port of the valve, > it contacts the flapper assembly and pivots it to an open position ... wherein fluid is permitted to enter the central area of the valve and exit through the [exit] port. However, should the fluid ... be discontinued or otherwise attempt to flow out from the central area through the [entry] port, the flapper assembly is pivoted by virtue of contact with such fluid and by the biasing force of the spring [which] serves to bias [the flapper assembly] into contact with the seat to achieve a fluid-tight seal therebetween.

The contents of the Maskell patent are incorporated herein in their entirety by this reference.

SUMMARY OF THE INVENTION

The check valve of the Maskell patent is a commercially useful product. However, when subjected to certain harsh environments, the valve may become less effective or fail sooner than desired. This is a particular risk when water flowing through the valve has low pH or high salt concentration, for example, as the water may cause pitting of the (typically stainless steel) biasing spring.

Accordingly, the present invention provides a check valve in which the biasing spring is isolated from the flowing water. The valve may include a cover having a dry cavity in which the spring is positioned and a separate covering section for the cavity. Attachment arms of a diverter member (flapper) may receive a pivot pin to which a pivot link is pinned. Water-tight seals additionally may receive the pivot pin and prevent water from entering the cavity. Further, a bail may firmly receive ends of the pivot pin to facilitate transfer of motion of the flapper into extension of the spring.

The result is an assembly in which water flow against the (closed) flapper in one direction causes it to pivot against the bail (and thus to open), in turn causing rotation of the pivot pin. Rotation of the pivot pin, in its turn, causes rotation (or other movement) of the pivot link, which extends the biasing spring. Should the water flow cease (or reverse direction), the spring will tend to contract to its normal length and the flapper will return to its closed position.

It thus is an optional, non-exclusive object of the present invention to provide a valve in which a biasing member is isolated from fluid flowing through the valve.

It is another optional, non-exclusive object of the present invention to provide a valve especially useful in certain harsh environments.

It is also an optional, non-exclusive object of the present invention to provide a check valve including a flapper configured to pivot about a pin.

It is a further optional, non-exclusive object of the present invention to provide a check valve in which a spring is positioned within a cover of the valve.

It is an additional optional, non-exclusive object of the present invention to provide a check valve in which a bail, attached to a pivot pin, facilitates transfer of motion of a flapper into extension of a spring.

Other objects, features, and advantages of the present invention will be apparent to those skilled in the relevant art with reference to the remaining text and the drawings of this application.

BRIEF DESCRIPTION OF THE DRAWING

The FIGURE is a perspective, partially-exploded view of portions of a check valve of the present invention.

DETAILED DESCRIPTION

Illustrated in the FIGURE is cover 10 of an exemplary check valve of the present invention. Cover 10 may be similar to the covers described in the Maskell patent. Indeed, cover 10 may substitute for those covers if desired. In use, cover 10 is intended to be (removably) attached to a housing and, together with the housing, to form part of a valve assembly.

Cover 10 typically (although not necessarily) has generally circular cross-section with protrusions 14 extending outward about its periphery 18. Consistent with the description in the Maskell patent, each protrusion 14 contains a bore 22 for receiving a screw or other fastener to attachment to the housing of the valve.

Again similar to the valve of the Maskell patent, that of the present invention may incorporate pin-receiving bores at or adjacent periphery 18 of cover 10. Such bores receive pin 26, connecting the pin 26 to cover 10. Pin 26 preferably is cylindrical in central part 28, albeit with D-shaped ends 30. Pin 26 may, however, assume other shapes, as may its ends 30. If ends 30 indeed are D-shaped, the flat portions of the "Ds" preferably face downward toward the housing when the valve is upright with cover 10 at its top.

Cover 10 may include cavity 34 in which (coil) spring 38 may be placed. A first end 42 of spring 38 may be anchored within cavity 34 in any suitable manner so that its second end 46 extends toward pin 26. Rather than being connected directly to pin 26 outside cover 10, however, second end 46 remains within cavity 34 and is connected to link 50. Link 50, in turn, is connected to central part 28 of pin 26 within cavity 34. Annular (or other) seals 54 receive pin 26 to either side of link 50, sealing boundaries of cavity 34 from fluid flowing through the valve.

Covering section 58 may function to cover cavity 34 to complete the isolation of spring 38 and link 50. Section 58 preferably snap-fits onto cavity 34 to provide a generally continuous upper surface 62 of cover 10. Section 58 may attach to cover 10 in other ways, however, if appropriate or desired.

Also illustrated in the FIGURE is bail 66, preferably (although not necessarily) made of plastic or other non-metallic material. Bail 66 may comprise elongated central portion 70 from which legs 74A and 74B extend. Each leg 74A and 74B may define a D-shaped bore 78 adapted snugly to receive a corresponding D-shaped end 30 of pin 26.

Finally, depicted in the FIGURE is flapper 82, which may if desired be similar to the diverter member of the flapper assembly of the Maskell patent. Extending from flapper 82 are one or more arms 86. In use, each arm 86 includes a bore 90 that receives pin 26—preferably between a seal 54 and a leg 74A or 74B.

Flapper 82 typically is two-sided, with first side 94 shown in the FIGURE. Fluid impinging sufficiently on first side 94 will tend to rotate flapper 82 (generally "into" the paper of the FIGURE) about pin 26 into an "open" position. This rotation itself may induce rotation of pin 26 depending on the amount of frictional contact between pin 26 and arms 86. Otherwise, flapper 82 will rotate into contact with central portion 70 of bail 66; because of the keyed connection of D-shaped bores 78 and D-shaped ends 30, such contact will cause bail 66 to induce rotation of pin 26. In either circumstance (or via a combination of the two circumstances), rotation of pin 26 will cause movement of link 50, which in turn will cause second end 46 to move away from first end 42, hence extending spring 38. Should the fluid impingement thereafter subside so as to be insufficient to overcome the contraction force of spring 38, the spring 38 indeed will contract, moving link 50 and causing pin 26 to rotate in the opposite direction, and returning flapper 82 to the "closed" position illustrated in the FIGURE. In the "closed" position, flapper 82 generally is seated (as described, for example, in the Maskell patent) so as to preclude further rotation (i.e. "out of" the paper of the FIGURE) and hence preclude any fluid impinging on the second side (not shown) of flapper 82 from exiting the valve via its entrance.

The assembly of the present invention thus provides a valve structure in which a biasing member, such as spring 38, is isolated from fluid flowing through the valve. Although part of presently-preferred versions of the invention, bail 66 is optional and may, in some cases, be omitted. The foregoing thus is provided for purposes of illustrating, explaining, and describing embodiments of the present invention. Modifications and adaptations to these embodiments will be apparent to those skilled in the art and may be made without departing from the scope or spirit of the invention.

The invention claimed is:
1. A valve comprising:
   a. a diverter member (i) movable between an open position facilitating fluid flow therebeyond and a closed position inhibiting fluid flow therebeyond and (ii) comprising a flapper having a plurality of bores;
   b. means, (i) indirectly connected to the diverter member and (ii) isolated from the fluid flow, for biasing the diverter member toward the closed position;
   c. a bail configured to contact the flapper at times during use;
   d. a pin received by (i) the bores of the flapper and (ii) bores of the bail; and
   e. a pivot link connected to (i) the biasing means and (ii) the pin.
2. A valve according to claim 1 further comprising a cover having a cavity therein and in which the biasing means is placed inside the cavity.
3. A valve according to claim 2 in which (i) the biasing means comprises a coil spring and (ii) the cover comprises a plurality of bores.
4. A valve according to claim 2 further comprising means for covering the cavity.
5. A valve comprising:
   a. a diverter member (i) movable between an open position facilitating fluid flow therebeyond and a closed position inhibiting fluid flow therebeyond and (ii) comprising a flapper having a plurality of bores;
   b. means, (i) indirectly connected to the diverter member, (ii) isolated from the fluid flow, and (iii) comprising a coil spring, for biasing the diverter member toward the closed position;
   c. a cover (i) comprising a plurality of bores and (ii) having a cavity therein, and in which the biasing means is placed inside the cavity;
   d. a pin received by the bores of (i) the flapper and (ii) the cover;
   e. a pivot link connected to (i) the coil spring and (ii) the pin; and
   f. a plurality of seals configured to receive the pin on opposite sides of the pivot link.
6. A check valve configured for use as part of a water-recirculation system of a swimming pool, spa, or hot tub, the valve comprising:
   a. a cover configured for attachment to a housing and comprising (i) a plurality of bores and (ii) a cavity isolatable from water of the water-recirculation system;
   b. a flapper from which at least one arm extends, the at least one arm comprising a bore;
   c. a coil spring having (i) a first end anchored within the cavity and (ii) a second end;
   d. means, comprising a covering section, for covering the cavity;
   e. a pivot link connected to the second end of the coil spring;
   f. a pin (i) received by the bores of the cover and the at least one arm, (ii) connected to the pivot link, and (iii) having D-shaped ends;
   g. a plurality of seals (i) receiving the pin and (ii) positioned on opposite sides of the pivot link; and
   h. a bail comprising a plurality of legs, each leg defining a D-Shaped bore for snugly receiving a D-shaped end of the pin.

* * * * *